(No Model.)
H. HIRSCHING.
PROCESS OF PRECIPITATING METAL SULFIDE FROM HYPOSULFITE SOLUTIONS.
No. 513,324.
Patented Jan. 23, 1894.
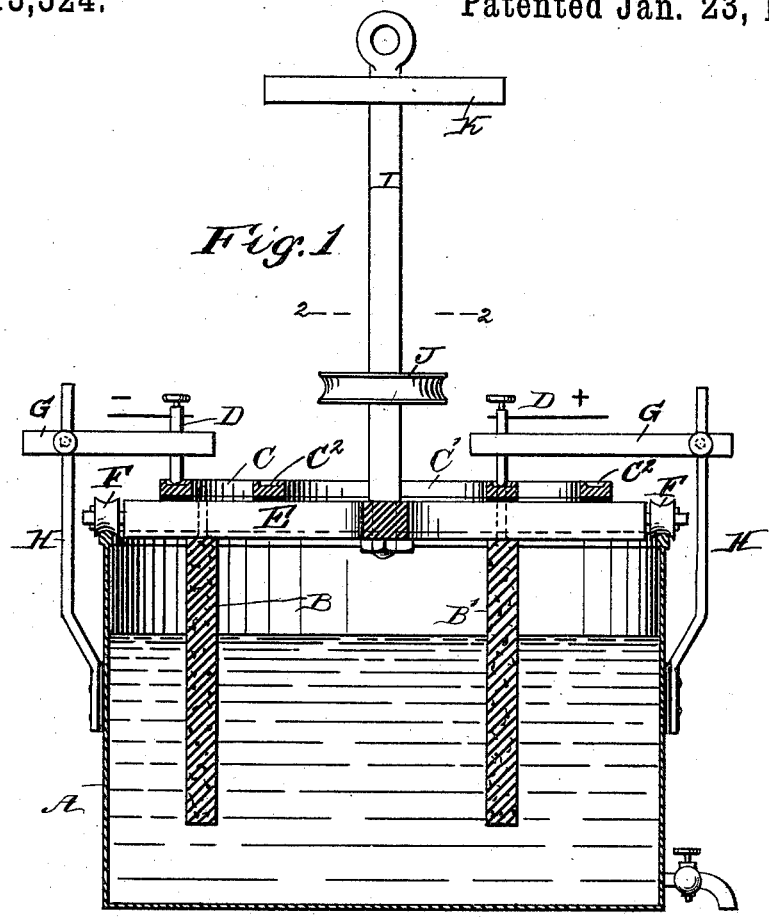
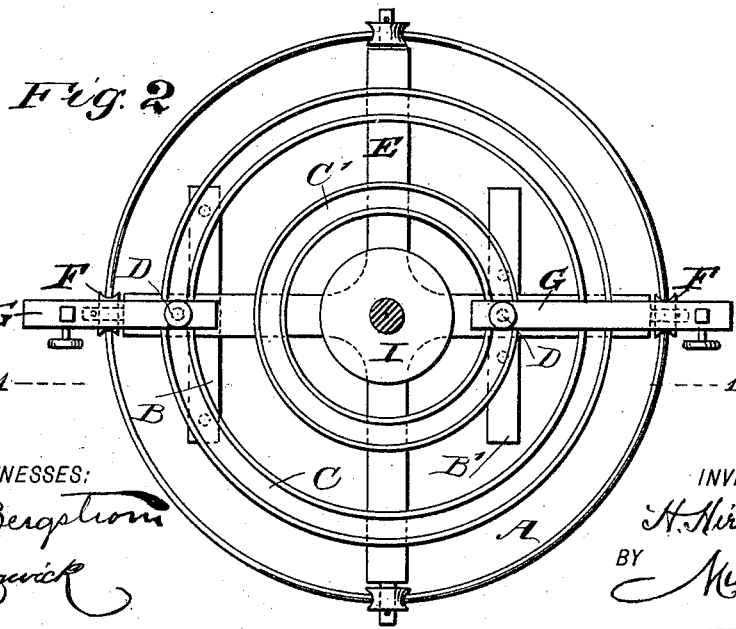
WITNESSES:
INVENTOR
H. Hirsching
BY Munn & Co.
ATTORNEYS.
THE NATIONAL LITHOGRAPHING COMPANY,
WASHINGTON, D. C.

UNITED STATES PATENT OFFICE.

HENRY HIRSCHING, OF SALT LAKE CITY, UTAH TERRITORY, ASSIGNOR OF ONE-HALF TO THOMAS R. ELLERBECK, OF SAME PLACE.

PROCESS OF PRECIPITATING METAL SULFIDE FROM HYPOSULFITE SOLUTIONS.

SPECIFICATION forming part of Letters Patent No. 513,324, dated January 23, 1894.

Application filed May 6, 1893. Serial No. 473,261. (No specimens.)

*To all whom it may concern:*

Be it known that I, HENRY HIRSCHING, a citizen of the United States, residing at Salt Lake City, in the county of Salt Lake, Territory of Utah, have invented a certain new and useful Process of Precipitating Metal Sulfides from Hyposulfite Solutions, of which the following is a full, clear, and exact description.

My invention relates to precipitating the metal sulphide out of a hyposulphite solution, such as hyposulphite of sodium, hyposulphite of calcium, &c., containing precious and other metals, from being in contact with compounds, or ores, chloridized, calcined or raw, containing precious or other metals. The hypo solution, which may be in any desired vessel,—a wooden tank, lined or saturated with an insulating substance preferred, I subject to an electric or to a galvanic action, which precipitates the metals as sulphides. The precipitate which results by my process, settles rapidly, and the clear hypo solution is used over again in the leaching vats for further dissolution of precious and other metals. The residuum consisting of metal sulphides, is washed with water until all or nearly all of the hyposulphite solution is washed out; the wash water is then drawn off, and the metal sulphides treated according to known processes.

Heretofore hyposulphite solutions used for the extraction of precious and other metals from ores, have been treated with sulphide or polysulphide of sodium or calcium solutions for precipitating the metals as sulphides. The preparation of sulphide or polysulphide of sodium or calcium, is expensive, offensive, detrimental to health and destructive to the used apparatus; and in case an excess of it be used as a precipitant, the hypo solution cannot successfully be used over again, unless restored at considerable expense. By the use of sulphide or polysulphide of sodium or calcium as a precipitant, the sulphide metals thus obtained contain a very high percentage of sulphur, which is a great disadvantage in the subsequent reduction process of the metal sulphides.

The object of my invention is to dispense with the objectionable matters due to the use of sulphides or polysulphides of sodium or calcium solutions, as precipitants and to obtain metal sulphides containing the minimum percentage of sulphur.

I here give a comprehensive description of the manipulation and operation of my invention, reference being had therein to the accompanying drawings which represent an apparatus such as I may use to carry out my invention.

Figure 1 is a vertical section of the apparatus taken essentially on line 1—1 of Fig. 2; and Fig. 2 is a sectional plan of the same on line 2—2 of Fig. 1.

Like letters indicate corresponding parts in both views.

The apparatus shown in the drawings consists of a tank or vessel A, preferably made of wood saturated with an insulating substance, like paraffine. In this tank are suspended the carbon or metal electrodes B and B' which are connected by means of the conducting rings C and C' respectively, with the contact making rods or brushes D. Each of the rods D is connected to one of the poles of an electric supply. As represented in the drawings, the electrodes may also have the function of agitators by being secured to a cross piece E, provided with rollers F that are adapted to travel on the upper edge of the tank. The conducting rings C C' are also secured to the cross piece E, and are preferably provided with grooves $C^2$ into which reach the lower ends of the rods D. The grooves may be filled with mercury, but as a rule this will not be necessary. The rods D are held on arms G which are vertically adjustable on supports H. The cross piece E may be rotated with the electrodes by means of the shaft I, provided with a pulley J and with a plate K adapted to be secured to a stationary timber or support.

Take any kind of a hyposulphite solution containing metals extracted from ores or other sources, and pour it into the tank A. Into this hyposulphite solution passes an electric current by connecting suspended carbon or metal plates in the solution, one plate with the positive and one with the negative pole of any electric source, such as dynamos, cells, &c. Immediately after passing the current into the solution metal sulphides are formed. The process is facilitated by raising the temperature of the solution to about 140° Fahrenheit. The current may be kept on until nearly all of the metal sulphides are precipitated; this is ascertained by adding a small quantity of sulphureted hydrogen gas water to a like quantity of the hyposulphite solution, which should show a slight cloudy color. By this simple and rapid process, only so much sulphur is taken from the hyposulphite solution, as is necessary to form the metal sulphides; and the original hyposulphite solution may be used over and over again; and in case the former strength is desired, only the small consumed quantity of hyposulphite salts need be added. The metal sulphides settle rapidly, and the clear solution can be readily drawn off for use again.

The metal sulphides obtained by my process, after washing until no hyposulphite solution is present, are easily reduced on account of their purity, and are treated by well known processes. As for example, I will assume that hyposulphite of sodium ($Na_2S_2O_3$) is used in solution and a silver compound is to be treated (the method of course also permits of refining impure silver, for instance by treating it with nitric acid and salt to form chloride of silver and mixing the chloride of silver solution with the hyposulphite of sodium solution). The silver compound and the hyposulphite of sodium solution are decomposed in the leaching vat, and the silver combines with sulphur and oxygen to form hyposulphite of silver, $Ag_2S_2O_3$. If chloride of silver is used, chloride of sodium will be formed, but this is a secondary reaction and I have omitted it from the chemical equations. One molecule of the hyposulphite of sodium combines with one molecule of hyposulphite of silver, forming the double salt ($Ag_2S_2O_3+Na_2S_2O_3$).

The equation is as follows:

$$2 \times Na_2S_2O_3 + Ag_2S_2O_3 = (2\times-1)Na_2S_2O_3 + (Ag_2S_2O_3 + Na_2S_2O_3).$$

The reaction which then ensues, is expressed by the equation:

$$(2\times-1)Na_2S_2O_3 + (Ag_2S_2O_3 + Na_2S_2O_2) = Ag_2S + Na_2S_3O_6 + (2\times-1)Na_2S_2O_3.$$

It will be noticed that the main portion of the hyposulphite of sodium remains unaltered. The equation may therefore be written as follows:

$$(Ag_2S_2O_3 + Na_2S_2O_3) = Ag_2S + Na_2S_3O_6.$$

The reaction differs according to the metals or compounds used (in some cases metallic oxides are formed in the course of the reaction), but the ultimate result is the formation of a metallic sulphide.

I am aware that it has been proposed to induce a galvanic action in a tank containing a hyposulphite of sodium solution, which would be the equivalent of employing a hyposulphite of sodium solution as a liquid for charging primary galvanic batteries; according to my invention, however, the source of the electric current is independent of the electrolytic tank, and I am enabled thereby to secure a complete and perfect reaction, while only a partial reaction ensues when the current is generated in the electrolyte itself.

Having described my invention, I claim—

The herein described process of precipitating metal sulphides from hyposulphite solutions, which consists in subjecting the said solution to the action of an electric current supplied from an external and independent source, substantially as set forth.

HENRY HIRSCHING

Witnesses:
S. W. SEARS,
W. E. HUBBARD.